United States Patent
Yun et al.

(10) Patent No.: US 7,706,308 B2
(45) Date of Patent: Apr. 27, 2010

(54) WIRELESS COMMUNICATION SYSTEM AND METHOD FOR OFFERING HYBRID DUPLEXING TECHNOLOGY

(75) Inventors: Sang-Boh Yun, Seongnam-si (KR); Yung-Soo Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 930 days.

(21) Appl. No.: 10/767,082

(22) Filed: Jan. 29, 2004

(65) Prior Publication Data

US 2004/0252659 A1    Dec. 16, 2004

(30) Foreign Application Priority Data

Jan. 29, 2003    (KR) .................... 10-2003-0006005

(51) Int. Cl.
*H04J 3/00*    (2006.01)
*H04J 1/00*    (2006.01)

(52) U.S. Cl. ..................... 370/280; 370/281

(58) Field of Classification Search ............... 370/280, 370/281, 331, 328, 338, 278, 329; 455/67.11, 455/67.13, 63.1, 436, 444
See application file for complete search history.

(56) References Cited

U.S. PATENT DOCUMENTS

| | | | |
|---|---|---|---|
| 6,130,886 A * | 10/2000 | Ketseoglou et al. | 370/347 |
| 6,269,086 B1 * | 7/2001 | Magana et al. | 370/280 |
| 6,351,456 B1 * | 2/2002 | Struhsaker et al. | 370/280 |
| 7,139,251 B1 * | 11/2006 | Varma | 370/280 |
| 7,248,841 B2 * | 7/2007 | Agee et al. | 455/101 |
| 7,366,133 B1 * | 4/2008 | Majidi-Ahy et al. | 370/329 |
| 7,502,596 B2 | 3/2009 | Takao et al. | |
| 2001/0012283 A1 * | 8/2001 | Miya et al. | 370/342 |
| 2001/0055288 A1 * | 12/2001 | Uebayashi et al. | 370/331 |
| 2002/0024937 A1 * | 2/2002 | Barnard et al. | 370/278 |
| 2003/0003882 A1 * | 1/2003 | Samuels et al. | 455/108 |
| 2003/0026215 A1 * | 2/2003 | Schafer | 370/280 |
| 2003/0109284 A1 * | 6/2003 | Akerberg et al. | 455/561 |
| 2004/0008647 A1 * | 1/2004 | Hunkeler | 370/333 |
| 2004/0095907 A1 * | 5/2004 | Agee et al. | 370/334 |

(Continued)

FOREIGN PATENT DOCUMENTS

EP    0 975 184    1/2000

(Continued)

*Primary Examiner*—George Eng
*Assistant Examiner*—Christopher M Brandt
(74) *Attorney, Agent, or Firm*—The Farrell Law Firm, LLP

(57) ABSTRACT

Disclosed is a wireless communication system for providing a service in a time division duplexing (TDD) mode and a frequency division duplexing (FDD) mode according to a duplexing mode determination factor of a mobile station in a base station communicating with the mobile station. During call setup, the mobile station transmits the duplexing mode determination factor to the base station, sets a TDD mode or an FDD mode as a reverse mode set by the base station, and sets up a channel for the set reverse mode and a forward channel to perform communication. During call setup, the base station receives the duplexing mode determination factor from the mobile station, sets a reverse mode to the TDD mode or the FDD mode using the received duplexing mode determination factor, and sets up a reverse channel for the set mode and a TDD mode for forward transmission to communicate with the mobile station.

30 Claims, 8 Drawing Sheets

U.S. PATENT DOCUMENTS

| | | | |
|---|---|---|---|
| 2004/0157561 A1* | 8/2004 | Akerberg | 455/67.11 |
| 2005/0002349 A1* | 1/2005 | Hayashi et al. | 370/320 |
| 2005/0037766 A1* | 2/2005 | Hans et al. | 455/450 |

FOREIGN PATENT DOCUMENTS

| | | | |
|---|---|---|---|
| EP | 1 168 878 | | 1/2002 |
| GB | 2398455 A | * | 11/2003 |
| JP | 2000-083277 | | 3/2000 |
| JP | 2001-339770 | | 12/2001 |
| JP | 2002-521937 | | 7/2002 |
| JP | 2002-345014 | | 11/2002 |
| WO | WO 0005912 | * | 2/2000 |

* cited by examiner

WIRELESS COMMUNICATION SYSTEM AND METHOD FOR OFFERING HYBRID DUPLEXING TECHNOLOGY

PRIORITY

This application claims priority under 35 U.S.C. § 119 to an application entitled "Wireless Communication System and Method for Offering Hybrid Duplexing Technology" filed in the Korean Intellectual Property Office on Jan. 29, 2003 and assigned Serial No. 2003-6005, the contents of which are incorporated herein by reference.

BACKGROUND OF THE INVENTION

1. Field of the Invention

The present invention relates generally to a system and method for offering communication technology, and in particular, to a system and method for offering different communication technologies.

2. Description of the Related Art

Generally, next generation wireless communication systems are expected to provide a multimedia service, which has already been provided in a $3^{rd}$ (3G) generation mobile communication system. In addition, the next generation wireless communication systems are expected to support a higher data rate than that of existing wireless communication systems. Therefore, the next generation wireless communication systems should be able to support a variable asymmetric service that efficiently provides multimedia traffic, and to reliably support a high data rate. "Asymmetric service" refers to a service in which a forward link (or downlink) and a reverse link (or uplink) have different data rates. Since the multimedia service is generally received at a mobile station, multimedia traffic needs a higher data rate on the forward link. In addition, the asymmetry rate must be variable. Herein, the "forward link" means a link from a base station to a mobile station, while the "reverse link" means a link from the mobile station to the base station.

Typically, duplexing technologies that can be used in wireless communication systems are classified into time division duplexing (TDD) and frequency division duplexing (FDD). A brief description of these duplexing technologies will be made herein below.

Time division duplexing refers to communication technology that divides transmission/reception by time. In this communication technology, for mobile stations, time for which data can be received and transmitted over a forward link and a reverse link is uniquely determined. In this way, the mobile stations perform communication within their unique times. At this point, a base station can assign a part of or all of the available time slots to a mobile station in communication. Therefore, time division duplexing is suitable to providing an asymmetric service by differentiating a time slot assigned to a forward link from a time slot assigned to a reverse link, both of which are set up between a base station and a particular mobile station. However, in time division duplexing, an increase in cell coverage causes round-trip delay, thereby increasing a guard time and undesirably decreasing transmission efficiency during transmission/reception. Therefore, time division duplexing. is not suitable for a cell having wide cell coverage, such as a macrocell. Moreover, in time division duplexing, since cells have different asymmetry rates in a cell environment, co-channel interference between mobile stations is undesirably increased.

Frequency division duplexing refers to communication technology that divides transmission/reception by frequency. In this technology, frequencies at which data can be received and transmitted over a forward link and a reverse link between a base station and a mobile station are individually set. In addition, communication between the mobile station and the base station is performed all the time using the set frequencies. Therefore, frequency division duplexing has no round-trip delay problem and is suitable to a macrocell. By virtue of wide coverage of the macrocell, frequency division duplexing can provide a service appropriate to a mobile station that moves fast from place to place. However, since a frequency band is symmetrically and fixedly assigned, frequency division duplexing has a limitation in providing a variable asymmetric service.

Since the next generation wireless communication service is required to support a high data rate for a mobile station that moves at high speed, there is a demand for a system that makes the best use of the advantages of time division duplexing and frequency division duplexing.

However, building a TDD cellular network up to a position where density of mobile stations is very low, with only TDD, which is suitable to a microcell, is disadvantageous in terms of economical efficiency.

SUMMARY OF THE INVENTION

It is, therefore, an object of the present invention to provide a wireless communication system and method for smoothly providing an asymmetric service.

It is another object of the present invention to provide a wireless communication system and method for asymmetrically providing a high-speed multimedia service.

It is a further object of the present invention to provide a wireless communication system and method for providing a high-speed multimedia service irrespective of a base station's shape and size.

It is yet another object of the present invention to provide a wireless communication system and method capable of asymmetrically providing a high-speed multimedia service and reducing installation cost of a base station.

It is still another object of the present invention to provide a system and method capable of simultaneously supporting a microcell and a macrocell.

In accordance with one aspect of the present invention, there is provided a wireless communication system for providing a service in a time division duplexing (TDD) mode and a frequency division duplexing (FDD) mode according to a duplexing mode determination factor of a mobile station in a base station communicating with the mobile station. During call setup, the mobile station transmits the duplexing mode determination factor to the base station, sets a TDD mode or an FDD mode as a reverse mode set by the base station, and sets up a channel for the set reverse mode and a forward channel to perform communication. During call setup, the base station receives the duplexing mode determination factor from the mobile station, sets a reverse mode to the TDD mode or the FDD mode using the received duplexing mode determination factor, and sets up a reverse channel for the set mode and a TDD mode for forward transmission to communicate with the mobile station.

In accordance with another aspect of the present invention, there is provided a call control method in a base station for a wireless communication system, the base station being capable of communicating with a mobile station in a time division duplexing (TDD) mode and a frequency division duplexing (FDD) mode. The method includes the steps of: during call assignment to the mobile station, analyzing a duplexing mode determination factor received from the mobile station to determine whether the mobile station is located in a close area; and assigning a TDD channel to a forward link and a reverse link if the mobile station is located in a close area, and assigning a TDD channel to the forward link and an FDD channel to the reverse link to perform communication if the mobile station is located in a remote area.

In accordance with further another aspect of the present invention, there is provided a call control method in a mobile station for a mobile communication system providing a time division duplexing (TDD) mode and a frequency division duplexing (FDD) mode. The method includes the steps of: generating a duplexing mode determination factor and reporting the generated duplexing mode determination factor to the base station when assignment of a call is necessary; upon receiving a mode for a reverse link from the base station, setting transmission and reception modes based on the received mode; and sending a channel assignment request to the base station to perform communication on a channel assigned during channel assignment.

In accordance with yet another aspect of the present invention, there is provided a base station apparatus for separately providing a service in a time division duplexing (TDD) mode and a frequency division duplexing (FDD) mode according to a distance between a base station and a mobile station. The base station apparatus includes a coding processor for performing TDD encoding and TDD decoding, and performing FDD decoding; a diplexer for separating a reception signal at a frequency band assigned to the FDD mode from a signal at a frequency band assigned to the TDD mode; a radio processor for down-converting a signal at a frequency band assigned to the FDD mode, and up- or down-converting a signal at a frequency band assigned to the TDD mode; a TDD transmission/reception separator for separating transmission and reception of a TDD duplexing signal between the coding processor and the radio processor; and a controller for controlling the TDD transmission/reception separator, the coding processor and the radio processor, and during call assignment to the mobile station, determining a reverse transmission mode according to a duplexing mode determination factor received from the mobile station and setting up a channel for the determined reverse mode and a forward channel.

In accordance with still another aspect of the present invention, there is provided a mobile station apparatus for a mobile communication system separately providing a service in a time division duplexing (TDD) mode and a frequency division duplexing (FDD) mode according to a distance between a base station and a mobile station. The mobile station apparatus includes a coding processor for performing TDD encoding and TDD decoding, and performing FDD encoding; a diplexer for separating a reception signal at a frequency band assigned to the FDD mode from a signal at a frequency band assigned to the TDD mode; a radio processor for up-converting a signal at a frequency band assigned to the FDD mode, and up- or down-converting a signal at a frequency band assigned to the TDD mode; a TDD transmission/reception separator for separating transmission and reception of a TDD signal between the coding processor and the radio processor; and a controller for controlling the TDD transmission/reception separator, the coding processor and the radio processor, and during call assignment, generating information obtained using a duplexing mode determination factor, delivering the generated information to the base station, and controlling communication using a channel assigned for a mode set by the base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
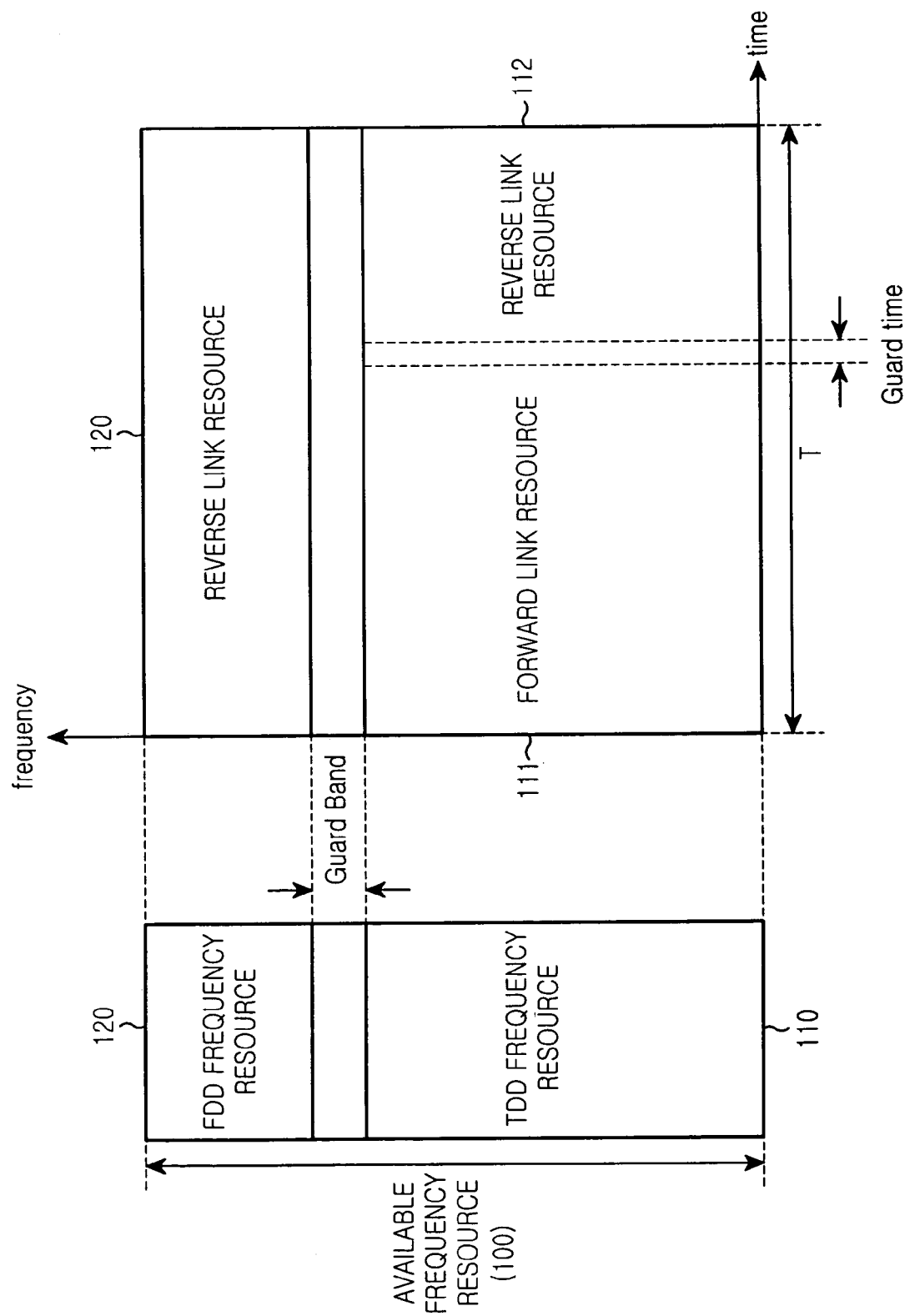
FIG. 1 is a diagram explaining a method of using available frequency resources in a wireless communication system according to the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

First, the present invention will be summarized. The invention provides a wireless communication system employing both time division duplexing and frequency division duplexing having different advantages. However, it should be noted that the time division duplexing and the frequency division duplexing are not simply used together. The present invention classifies base stations into macrocells and microcells according to their coverage, and classifies service areas into a close area and a remote area according to a distance from a base station to a mobile station. Since the classifications are conducted in a similar method, the macrocell and the remote area from a base station will be commonly referred to as a "remote area" in the following description. In contrast, the microcell and the close area from a base station will be referred to in common as a "close area." Therefore, the invention performs communication according to different methods in the close area and the remote area. In addition, the invention provides a method for smoothly performing communication not only when the mobile station moves from a close area to a remote area but also when the mobile station moves from a remote area to a close area. Moreover, the invention provides for inter-system coordination, which may occur when time division duplexing and frequency division duplexing are simultaneously used.

With reference to FIG. 1, a detailed description will be made regarding a method of using available frequency resources in a wireless communication system according to the present invention. Reference numeral 100 represents frequency resources available in a base station. The present invention divides the frequency resources available in a mobile station into two areas. After dividing the available frequency resources into two areas, the invention uses one frequency resource area as TDD frequency resource area 110, and the other frequency resource area as FDD frequency resource area 120. Here, the TDD frequency resource area 110 is assigned more frequency resources than the FDD frequency resource area 120. Frequency resources of the FDD frequency resource area 120 are frequency resources assigned to a particular mobile station, and are assigned to only a reverse link. Therefore, the FDD frequency resource area 120 is assigned less frequency resources than the TDD frequency resource area 110. A description will now be made as to how frequency resources available in a base station are allocated to a forward link and a reverse link.

Frequencies of the FDD frequency resource area 120, as mentioned above, are exclusively used only for the reverse link. Therefore, for reverse data transmission, a base station assigns frequencies of the FDD frequency resource area 120 to particular mobile stations, which will be described later among mobile stations desiring to transmit data over a reverse link.

In addition, as for frequencies of the TDD frequency resource area 110, all frequency resources are used on a time-sharing basis. Therefore, a forward link is identical to a reverse link in frequency used, but different in time band of the frequency used. That is, as illustrated in the right side of FIG. 1, the TDD frequency resource area 110 is divided into a period for which forward link traffic is transmitted, and a period for which reverse link traffic is transmitted. A term for which the forward link traffic transmission and the reverse link traffic transmission are repeated becomes one period T. In addition, a guard time is necessary between the forward link traffic transmission and the reverse link traffic transmission. Such a time boundary is provided to prevent overlapping between forward transmission and reverse transmission due to time delay.

The use of frequency and time will now be described with reference to the right side of FIG. 1. A frequency of the FDD frequency resource area 120 is assigned only to a particular mobile station, and becomes a frequency that is always used only for reverse transmission irrespective of time. As for the TDD frequency resource area 110, all frequency resources are assigned to a particular mobile station for traffic transmission. Therefore, the TDD frequency resource area 110 is divided into a period 111 for which a forward link is formed and a period 112 for which a reverse link is formed, and a guard time is required between the period 111 and the period 112.

Figure 2:
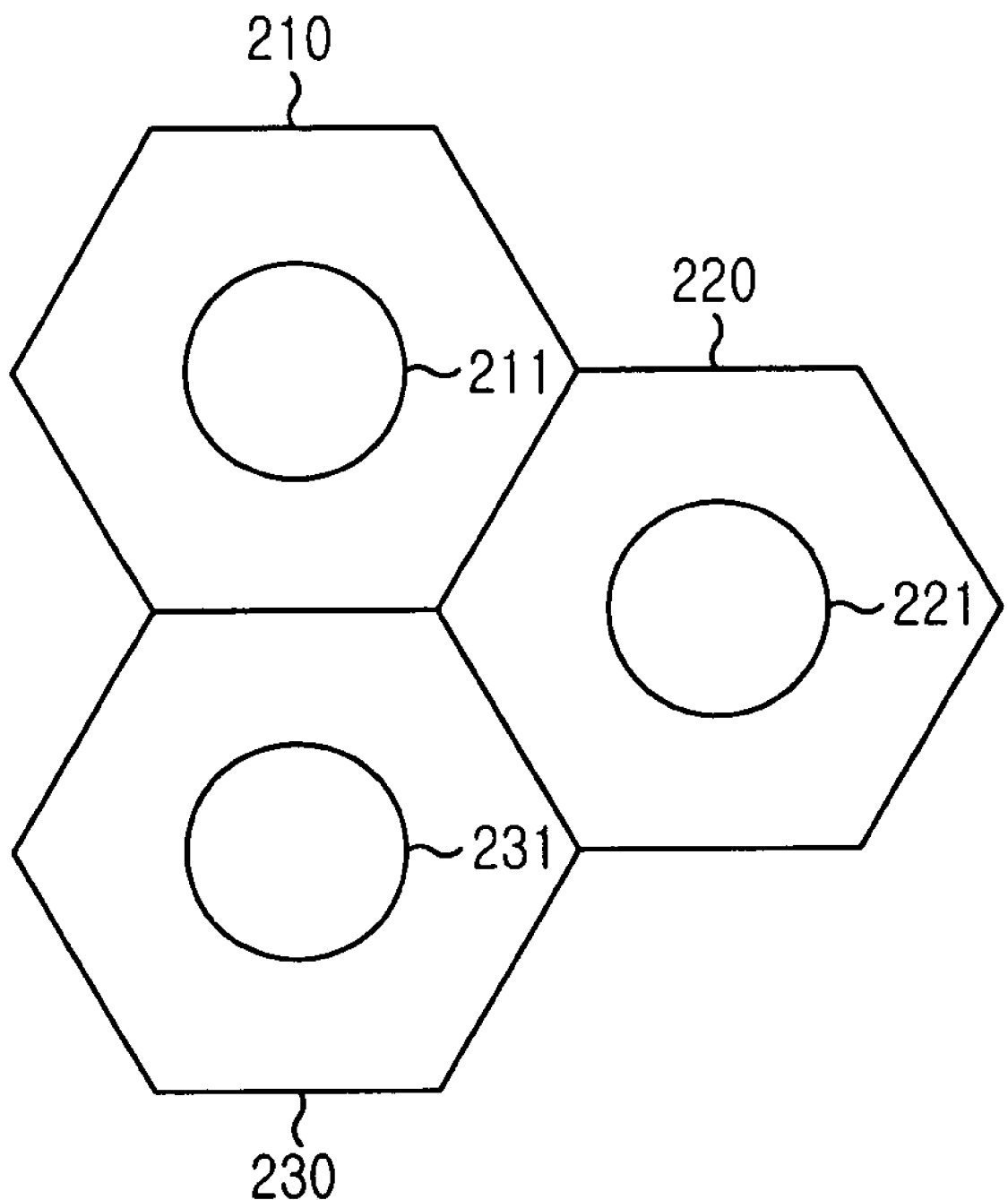
FIG. 2 is a diagram separately explaining areas where FDD frequency resources and TDD frequency resources are assigned in a base station according to the present invention.

FIG. 2 is a diagram for separately explaining areas where FDD frequency resources and TDD frequency resources are assigned in a base station according to the present invention.

In FIG. 2, hexagonal cells 210, 220 and 230 show ideal shapes of base stations when the base stations are part of a cellular mobile communication system. The base stations are located in the centers of the hexagonal cells 210, 220 and 230. While the hexagonal cells are the ideal shapes when the base stations are part of a cellular mobile communication system, the cells may also have shapes other than hexagons. However, it will be assumed herein that the cells have the shown hexagonal shape, for the convenience of explanation. Circles 211, 221 and 231 included in the hexagonal cells 210, 220 and 230 show the positions of the base stations, spaced apart from each other by a predetermined distance. In such an ideal case, the respective base stations can define the area inside the circles 211, 221 and 231 as "close areas" and the area outside the circles 211, 221 and 231 as "remote areas."

In this way, the base stations have unique areas, which are divided into close areas, and remote areas. If the base stations are sector-type base stations, each sector has a close area and a remote area. If a base station has two or more FAs (Frequency Allocations), the FAs may be different from each other in the close and remote areas. When a base station is actually located, a close area of the base station can be distinguished from a remote area of the base station according to either a level of a pilot signal reported from a mobile station or a level of transmission power during transmission. That is, a duplexing mode determination factor may include a distance between a base station and a mobile station, a velocity of the mobile station, a received signal's power level of the base station and the mobile station, etc. One of these factors will be described by way of example. If a pilot signal level reported from the mobile station is lower than a predetermined threshold, it can be determined that the mobile station is located in a remote area, while if a pilot signal level reported from the mobile station is higher than or equal to the predetermined threshold, it can be determined that the mobile station is located in a close area. Conversely, during communication between a base station and a mobile station, if traffic must be transmitted at higher power than a predetermined threshold, it can be determined that the mobile station is located in a remote area, while if traffic must be transmitted at power lower than or equal to the predetermined threshold, it can be determined that the mobile station is located in a close area.

In an alternative method, a base station may have previously stored shape information for a map of a base station area, and may also have previously stored information on its close area and remote area. In this case, if a location signal is received from a mobile station the base station can match location information reported from the mobile station to map information, and accordingly distinguish a mobile station in a close area from a mobile station in a remote area. It is noted that the above methods can be applied independently, or two or more methods can be used together. In addition, the term "duplexing mode determination factor" as used herein refers to information based on all factors used to determine the duplexing mode. Therefore, a mobile station creates the duplexing mode determination factor in a predetermined message format, and reports the created duplexing mode determination factor to a base station.

A detailed description will now be made of a method for dividing a frequency resource area into the TDD frequency resource area 110 and the FDD frequency resource area 120 as illustrated in FIG. 1, and forming a forward link and a reverse link when base stations are divided into a base station in a remote area and a base station in a close area as illustrated in FIG. 2 according to the present invention.

When communicating with a mobile station located in its close area, a base station communicates both a forward link and a reverse link on a TDD basis. In addition, when a mobile station is located in a remote area, a forward link is communicated on a TDD basis while a reverse link is communicated on a FDD basis. That is, a forward link set up between a base station and a mobile station always transmits traffic using a frequency of the TDD frequency resource area 110 irrespective of whether the mobile station is located in a close area or a remote area.

When a mobile station is located in a close area, a reverse link transmits traffic using a frequency of the TDD frequency resource area 110. In addition, when the mobile station is located in a remote area, the reverse link transmits traffic using a frequency of the FDD frequency resource area 120. In this manner, more frequency resources are allocated to the forward link, thus enabling an asymmetric service. In addition, the forward link has a variable width by dividing the TDD frequency by a predetermined time period. Therefore, it is possible to provide a variable asymmetric service in which widths of the forward link and the reverse link can be varied, rather than a fixed asymmetric service in which widths of the forward link and the reverse link are fixed.

In addition, dividing the available frequency resources 100 into the FDD frequency resource area 120 and the TDD frequency resource area 110 can be optimized through simulation or experiment. Moreover, the TDD frequency resource area 110 and the FDD frequency resource area 120 can be uniquely assigned to base stations, or equally assigned to all the base stations.

Figure 3:
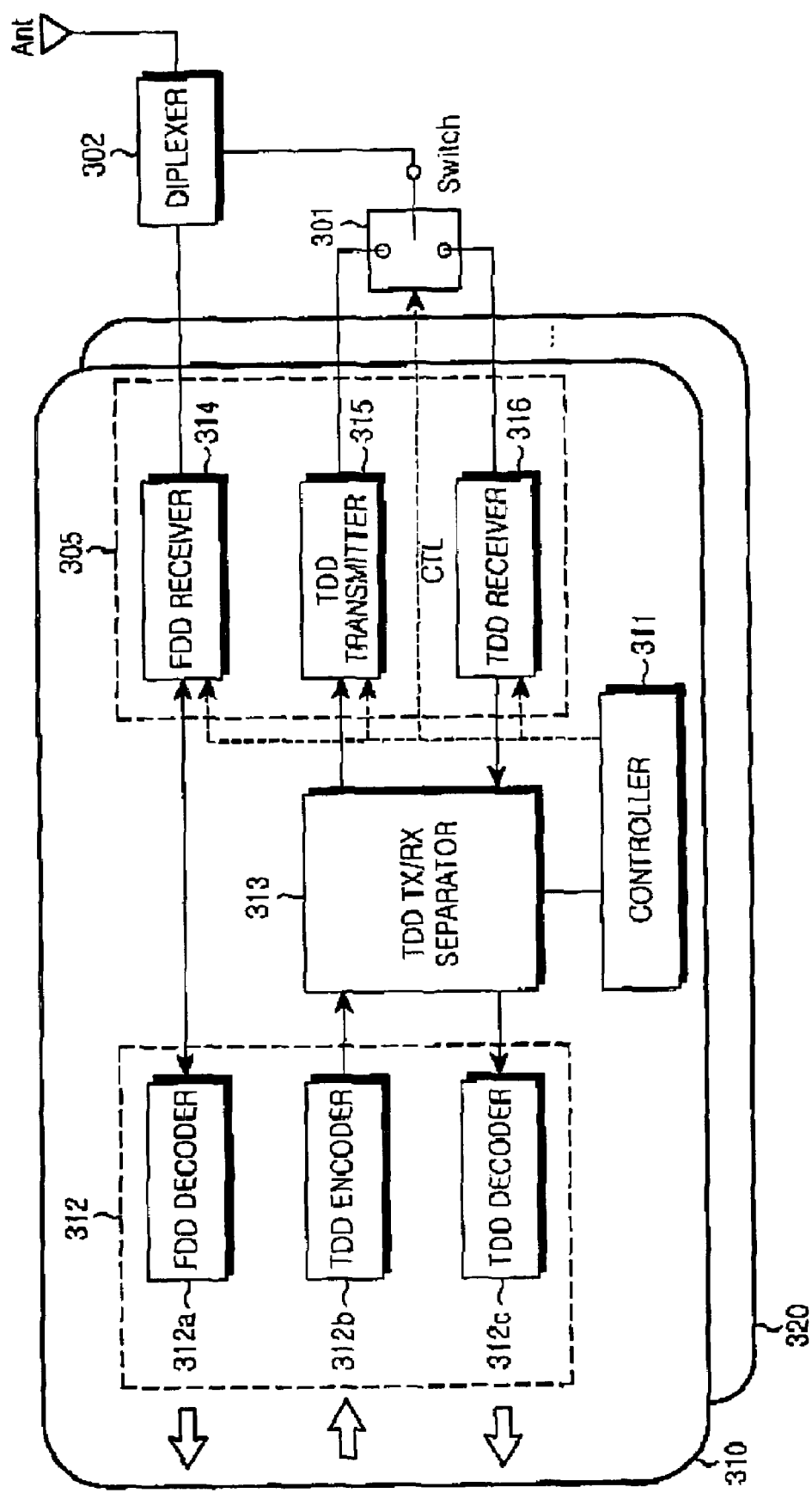
FIG. 3 is a block diagram illustrating a traffic transmission/reception block for a base station apparatus in a wireless communication system employing TDD and FDD according to the present invention.

FIG. 3 is a block diagram illustrating a traffic transmission/reception block for a base station apparatus in a wireless communication system employing TDD and FDD according to the present invention.

Each of processors 310, . . . , 320 included in the base station apparatus is roughly divided into a controller 311, a TDD transmission/reception separator 313, a coding processor 312, and a modem and radio processor 305. The coding processor 312 is comprised of an FDD decoder 312a, a TDD encoder 312b, and a TDD decoder 312c. The modem and radio processor is comprised of an FDD receiver 314, a TDD transmitter 315, and a TDD receiver 316.

The FDD decoder 312a included in the coding processor 312 decodes coded symbols received over a reverse link into predetermined data. In addition, the FDD decoder 312a is connected to the FDD receiver 314 included in the modem and radio processor 305. The FDD receiver 314 down-converts a reverse link radio signal received from a diplexer 302, and provides the down-converted signal to the FDD decoder 312a.

The TDD encoder 312b and the TDD decoder 312c included in the coding processor 312 are connected to the TDD transmission/reception separator 313. Also, the TDD transmitter 315 and the TDD receiver 316, included in the modem and radio processor 305, are connected to the TDD transmission/reception separator 313. The TDD encoder 312b encodes transmission traffic and provides the coded transmission traffic to the TDD transmission/reception separator 313. The TDD transmission/reception separator 313 then provides the received coded traffic to the TDD transmitter 315, and the TDD transmitter 315 up-converts the coded traffic and provides the up-converted coded traffic to a switch 301. In addition, the TDD receiver 316 down-converts a signal received from the switch 301 and provides the down-converted signal to the TDD transmission/reception separator 313. The TDD transmission/reception separator 313 provides a signal received from the TDD receiver 316 to the TDD decoder 312c. A control operation for separating transmission traffic and reception traffic by the TDD transmission/reception separator 313 is performed by the controller 311. The controller 311, as described in conjunction with FIG. 1, controls a path for transmission/reception traffic of the TDD transmission/reception separator 313 according to transmission of a forward link and a reverse link. In addition, the controller 311 controls respective blocks in the coding processor 312, and also controls modulation/demodulation and radio processing of the modem and radio processor 305. In addition, the controller 311 controls the switch 301 to connect with the TDD transmitter 315 or the TDD receiver 316. The switching operation controlled by the controller 311 is performed at a transmission time of a forward link and a reverse link, as illustrated in FIG. 1. The switch 301, under the control of the controller 311, connects the diplexer 302 to the TDD transmitter 315 or the TDD receiver 316.

The diplexer 302 is connected to an antenna Ant, the FDD receiver 314, and the switch 301. The diplexer 302 separates a signal of a frequency band corresponding to the FDD frequency resource area 120 illustrated in FIG. 1 from the frequency band signals received from the antenna Ant, and provides the separated frequency band signal to the FDD receiver 314. In addition, the diplexer 302 separates a signal of a frequency band corresponding to the TDD frequency resource area 110 illustrated in FIG. 1 from the frequency band signals received from the antenna Ant, and provides the separated frequency band signal to the switch 301. The diplexer 302 also transmits a signal received from the switch 301 to mobile stations via the antenna Ant. Radio band traffic that the diplexer 302 receives from the switch 301 and outputs to the antenna Ant becomes traffic which is transmitted at a forward link time at a frequency from the TDD frequency resource area 110 illustrated in FIG. 1.

Figure 4:
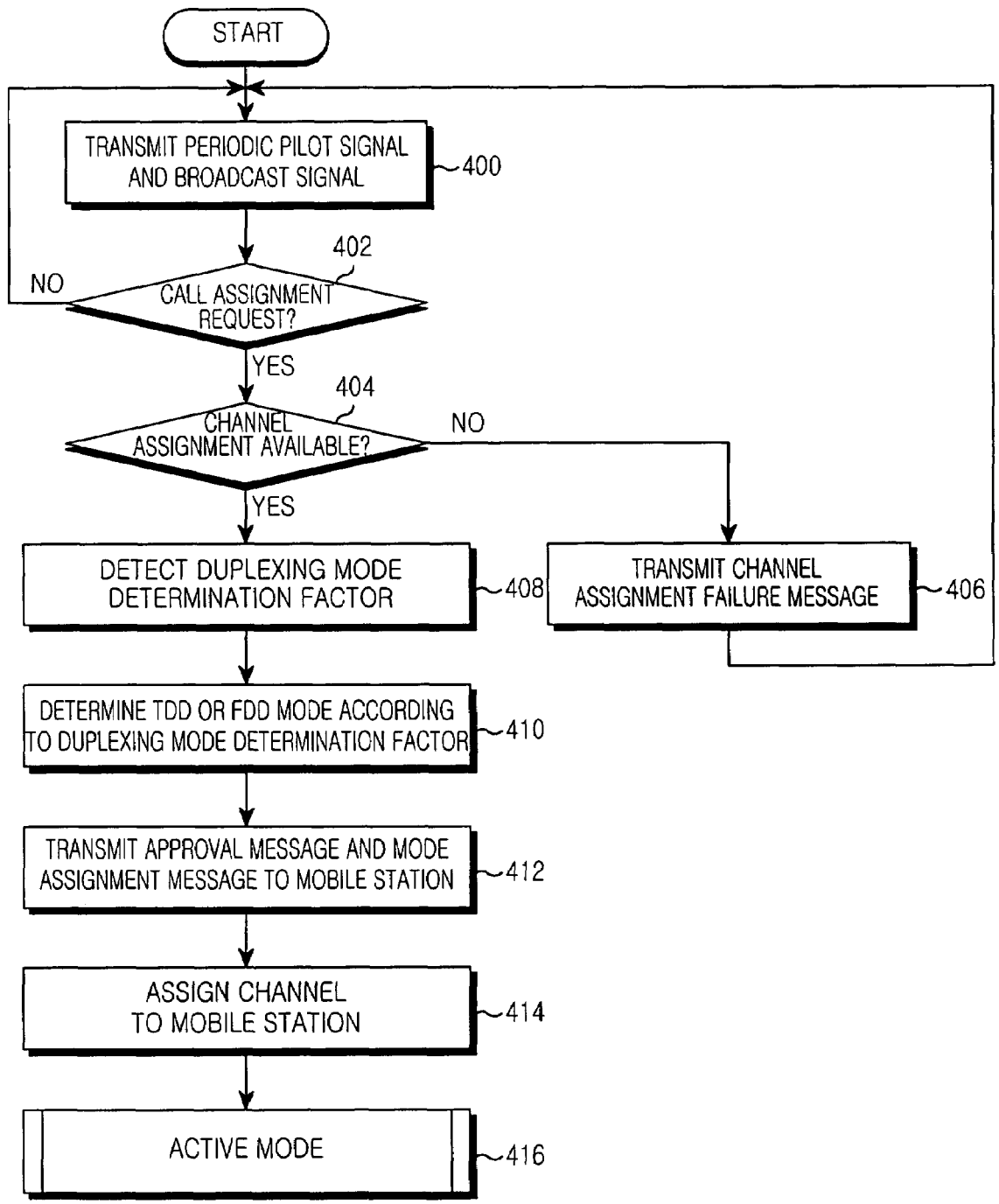
FIG. 4 is a flowchart illustrating a procedure for assigning a call to a mobile station in a base station apparatus for a mobile communication system employing TDD and FDD according to the present invention.

FIG. 4 is a flowchart illustrating a procedure for assigning a call to a mobile station in a base station apparatus for a mobile communication system employing TDD and FDD according to the present invention.

In step 400, the controller 311 of the base station controls transmission of a pilot signal preferably periodically and controls transmission of information needed to be broadcasted. Therefore, in step 400, the base station periodically transmits a pilot signal, and transmits broadcast information to mobile stations included in a cell of the base station. The base station may also constantly transmit a pilot signal. For such transmission control, the controller 311 determines in step 402 whether call assignment to a particular mobile station is requested. Such call assignment includes both one case where a call is terminated at a mobile station from an upper network of the base station, and another case where a call origination is requested by a mobile station. If it is determined in step 402 that call assignment to a particular mobile station is requested, the controller 311 proceeds to step 404. Otherwise, if call assignment is not requested, the controller 311 returns to step 400.

If call assignment to a particular mobile station is requested, the controller 311 checks the physical resources and channel resources currently left in the base station in step 404, to determine whether channel assignment is available. If it is determined in step 404 that channel assignment is available, the controller 311 proceeds to step 408. However, if channel assignment is unavailable, the controller 311 proceeds to step 406 where it generates a channel assignment failure message and transmits the generated channel assignment failure message. At this point, when call assignment was requested by a mobile station, the channel assignment failure message is transmitted to the mobile station over a particular control channel, and when call assignment was requested from an upper network of the base station, the controller 311 transmits the channel assignment failure message to a particular node that requested the call assignment.

In the following description, FIG. 4 will be described on the assumption that call assignment was requested by a mobile station. Therefore, in a state where call assignment is requested by the mobile station, the mobile station receives a pilot channel signal transmitted in step 400 before sending a call assignment request to the base station, and receives other broadcast signals over a broadcast channel. That is, the mobile station has completed initial timing synchronization and initial frequency offset synchronization with the base station. In this state, if transmission traffic is generated, the mobile station transmits a call assignment request message over a random access channel. At this point, the mobile station can report the power level of a pilot signal received from the base station along with the call assignment request message, or can transmit geographical position information of the mobile station. A detailed description thereof will be made later with reference to the control procedure of the mobile station.

If it is determined in step 404 that channel assignment is available, the controller 311 of the base station detects a duplexing mode determination factor received from the mobile station in step 408. The duplexing mode determination factor, as mentioned above, includes a distance between a base station and a mobile station, a velocity of the mobile station, a received signal's power level of the base station and the mobile station, etc. In addition, the duplexing mode determination factor may include a time offset of a call assignment request signal received from the mobile station over a particular access channel. In addition, at this moment, if either or both of geographical position information of a mobile station and power information of a pilot signal are received from the mobile station, the controller 311 checks the received information. Since such control information received over a particular access channel is information that is received over a forward link, it is received using FDD frequency resources or other predetermined frequency resources. Therefore, information received over a particular access channel is information that is received at the FDD receiver 314 via the diplexer 302 and then applied to the controller 311, or information that is decoded in the FDD decoder 312a of the coding processor 312 and then applied to the controller 311. Such signaling paths are not illustrated in FIG. 3, for simplicity of the drawing.

After completing measurement and analysis on the received information, the controller 311 proceeds to step 410 where it determines a mode for reverse transmission according to the detected duplexing mode determination factor. Based on the above information, the controller 311 determines whether the mobile station is located in a close area or a remote area. Assuming that the duplexing mode determination factor includes a velocity of a mobile station, if a mobile station moves at higher velocity than a predetermined threshold velocity, the controller 311 determines that even if a mobile station is located in a close area, it is treated as a mobile station located in a remote area. This is because although the mobile station is currently located in a close area, it can be soon located in a remote area, and in this case, handover between the areas occurs frequently. Therefore, in order to reduce a load of the mobile station and use channel resources more efficiently, a remote area is set for a mobile station moving at a high velocity The other factors are used to determine whether the mobile station is a mobile station in a close area, located within a circle of a cell illustrated in FIG. 2, or a mobile station in a remote area, located outside the circle, according to buildings around the base station or a geographical condition of a place where the base station is located. Although the close area illustrated in FIG. 2 can be changed in its shape according to a geographical position where the base station is located, the invention will be described on the assumption that the close area is roughly circular in shape, for the convenience of explanation. Therefore, the controller 311 determines a reverse transmission mode according to the determination result. That is, the present invention performs reverse transmission using TDD frequency resources, for a mobile station existing in a close area, and performs reverse transmission using FDD frequency resources, for a mobile station located in a remote area. The controller 311 sets a reverse transmission mode according to such a determination result in step 410. At this point, if reverse transmission is performed using TDD frequency resources as the mobile station is located in a close area, then a slot ID (identifier) value assigned to the mobile station can be determined. When reverse transmission is performed by a plurality of mobile stations, each mobile station is assigned its own unique time slot for reverse transmission. Such time slot assignment is performed in the controller 311, and actually, performed in a scheduler of a base transceiver subsystem (BTS). Therefore, if a reverse time slot of a corresponding mobile station is determined, the controller 311 determines an ID of the time slot as well.

Thereafter, in step 412, the controller 311 generates an approval message indicating approval of channel assignment to a mobile station and a mode assignment message, and transmits the generated approval message and mode assignment message to the mobile station. The mode assignment message can include a time slot ID when a time slot is uniquely assigned to each mobile station as mentioned above. In the base station, as for a transmission path of the messages, the messages may be transmitted from the controller 311 through the TDD transmitter 315, or the messages may be transmitted via the TDD encoder 312b after being up-converted in the TDD transmitter 315. The present invention does not restrict such transmission paths.

If a channel, or a time slot, assigned to a mobile station is not determined in step 410, the controller 311 assigns a channel to the mobile station in step 414. If a channel is set up to the mobile station in this manner, the base station can communicate by controller 311 with the mobile station in a set mode in step 416. Here, "set mode," as mentioned above, means that a reverse transmission mode in which transmission from a mobile station to a base station is performed is set to a TDD mode or a FDD mode.

Figure 5:
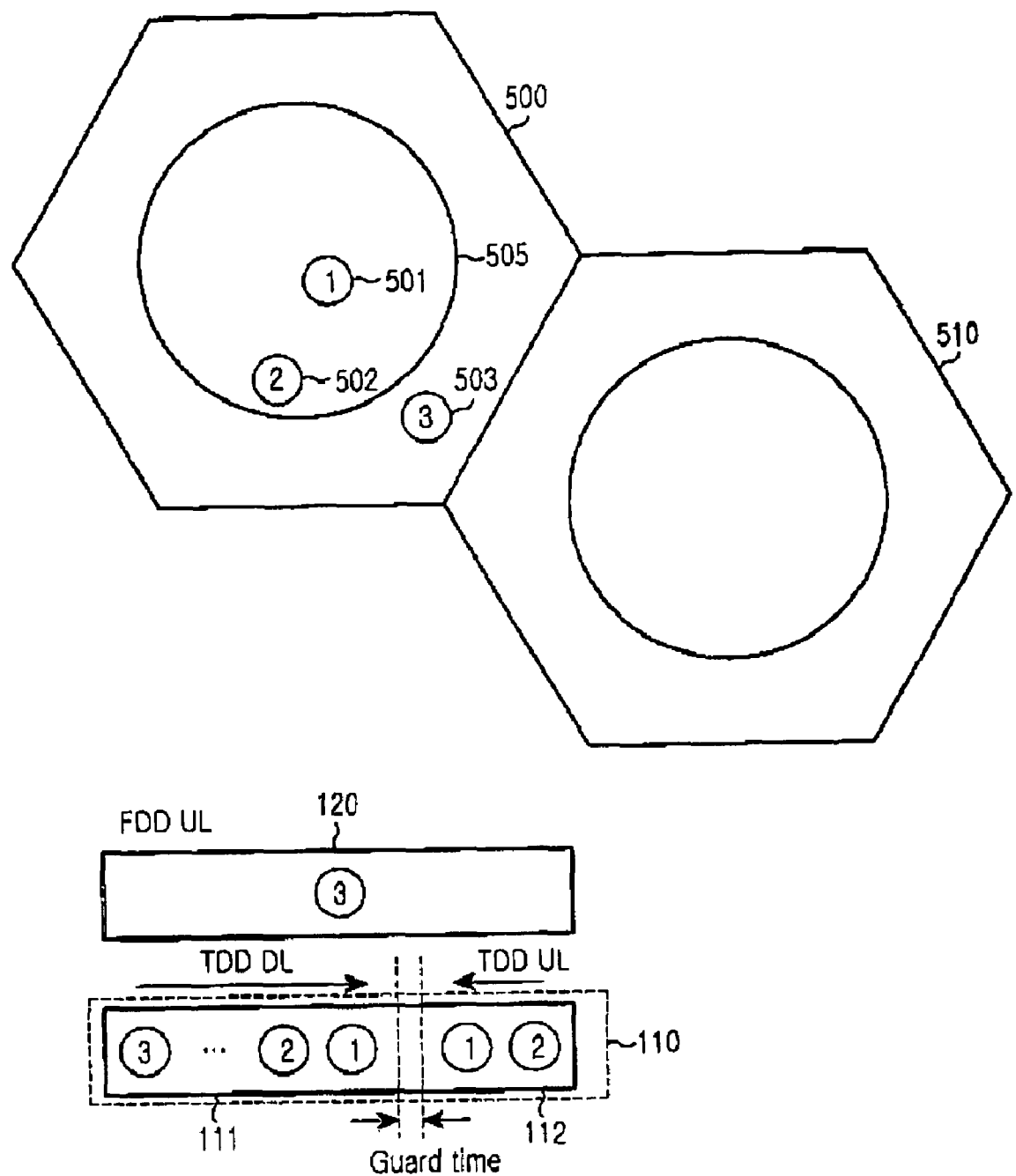
FIG. 5 is a diagram illustrating a method for assigning a time slot to a mobile station in a base station apparatus for a mobile communication system employing TDD and FDD according to the present invention.

FIG. 5 is a diagram illustrating a method for assigning frequencies to assign a call to a mobile station in a base station apparatus for a mobile communication system employing TDD and FDD according to the present invention.

Hexagonal cells illustrated in the upper section of FIG. 5 show ideal shapes of base stations in the cellular mobile communication system illustrated in FIG. 2. That is, reference numerals 500 and 510 define their associated base station coverage areas. A circle 505 within the base station coverage area 500 shows a theoretical boundary for distinguishing between a close area and a remote area from the base station. Mobile stations 501, 502 and 503 located in the base station coverage area 500 are illustrated to describe assignment of frequencies and time slots according to their positions. As illustrated in FIG. 5, it is assumed that a first mobile station 501 is located nearest to the base station in the close area, a second mobile station 502 is located second nearest to the base station in the close area, and a third mobile station 503 Is located in the remote area. Under this assumption, frequency assignment will be described with reference to lower section of FIG. 5.

As illustrated in the lower section of FIG. 5, the TDD frequency resource area 110 of the frequency resources available in the base station is divided into a period 111 to be assigned to a forward link and a period 112 to be assigned to a reverse link. In this case, the base station transmits traffic to all mobile stations over a forward link through the TDD frequency resource area 110. Therefore, the base station assigns time slots to mobile stations beginning at a time slot close to a guard time in order of distance of each mobile station to the base station. The base station assigns a time slot close to the guard time for a forward link to the first mobile station 501 nearest to the base station, and assigns a time slot preceding the time slot for the first mobile station 501 to the second mobile station 502 second nearest to the base station. In addition, the base station assigns the leading time slot to the third mobile station 503 located in the remote area. In this method, for example, forward transmission is first performed for one period T, and reverse transmission is performed after the guard time. However, even when reverse transmission is first performed and forward transmission is performed after the guard time, time slots can be assigned to the mobile stations in the same method. That is, a time slot closest to the guard time is assigned to a mobile station located in the close area.

Next, reverse transmission will be described. Mobile stations assigning TDD frequency resource for a reverse link assign a mobile station closest to the base station at a time slot close to the guard time. That is, the first mobile station 501 nearest to the base station is assigned to a reverse transmission time slot close to the guard time, and the second mobile station 502 which is a second nearest mobile station among the mobile stations using the TDD frequency resource for a reverse link is assigned to the next time slot. By assigning time slots to the mobile stations using the TDD frequency resource in this way, it is possible to minimize interference due to synchronization failure. In addition, it is possible to minimize interference between mobile stations occurring due to forward/reverse collisions of time slots between neighboring cells due to a mismatch of an asymmetry rate between the neighboring cells. Moreover, since mobile stations located in a remote area from the base station use FDD for reverse transmission, they do not suffer synchronization failure due to TDD. Also, interference due to a difference between traffic asymmetry rates is minimized.

More specifically, the base stations 500 and 510 perform forward link transmission and reverse link transmission using TDD frequency resources, and are synchronized every transmission period. In addition, a ratio of forward transmission to reverse transmission can be changed according to time slots assigned to the forward link and the reverse link. This will be described on the assumption that the period T is 20 ms and each time slot for the time T is 1.25 ms. In this case, the base stations each have 32 time slots. Here, if 2 time slots are designated as a guard time, a period where data transmission is actually performed includes 30 time slots. It is assumed herein that the first base station 500 performs forward transmission for 24 time slots and reverse transmission for 6 time slots, and the second base station 510 performs forward transmission for 20 time slots and reverse transmission for 10 time slots.

As a result, the first base station 500 performs forward transmission for $1^{st}$ to $24^{th}$ time slots, and performs reverse transmission for $27^{th}$ to $32^{nd}$ time slots after the guard time of $25^{th}$ and $26^{th}$ time slots. The second base station 510 performs forward transmission for $1^{st}$ to $20^{th}$ time slots, and performs reverse transmission for $23^{rd}$ to $32^{nd}$ time slots after the guard time of $21^{st}$ and $22^{nd}$ time slots. Therefore, the second base station 510 waits for data reception for the $23^{rd}$ and $24^{th}$ time slots. At this point, however, since the first base station 500 is transmitting data, inter-base station interference may occur.

In this case, if a mobile station in a close area is assigned to a time slot closest to the guard time for a forward link as illustrated in FIG. 5, transmission/reception can be performed at low power. Therefore, transmission power of the base station and the mobile station is reduced, contributing to a decrease in interference to another base station or interference between mobile stations belonging to another base station. Interference due to a difference between traffic asymmetry rates is also minimized.

Figure 6:
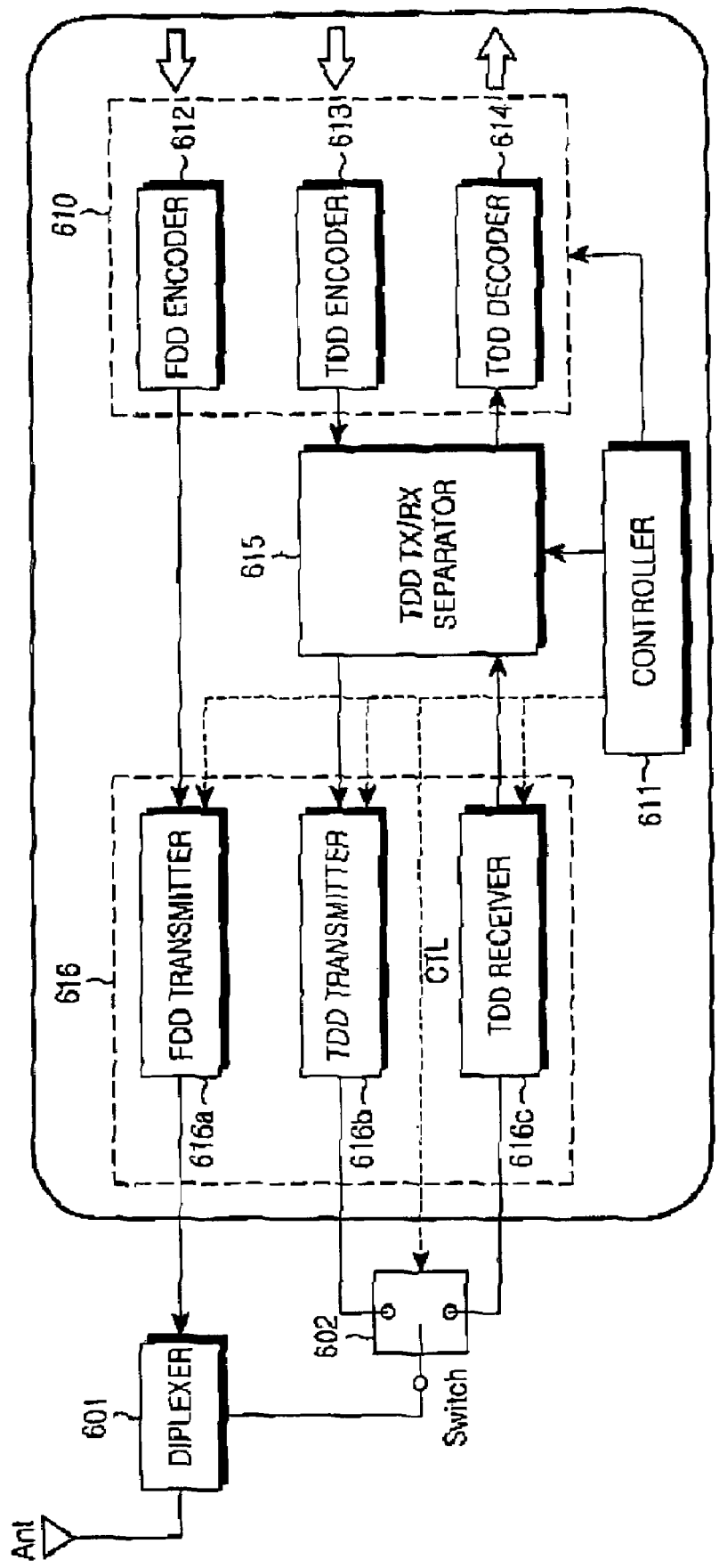
FIG. 6 is a block diagram illustrating a traffic transmission/reception block for a mobile station in a wireless communication system employing TDD and FDD according to the present invention.

FIG. 6 is a block diagram illustrating a traffic transmission/reception block for a mobile station in a wireless communication system employing TDD and FDD according to the present invention. The structure and operation of the traffic transmission/reception block will now be described.

A mobile station according to the present invention includes a coding processor 610, a modem and radio processor 616, a TDD transmission/reception separator 615, a controller 611, a switch 602, a diplexer 601, and an antenna Ant. An FDD encoder 612 included in the coding processor 610 encodes transmission traffic or messages and provides the encoded traffic or message to an FDD transmitter 616a in the modem and radio processor 616, under the control of the controller 611. A TDD encoder 613 included in the coding processor 610 encodes transmission traffic or messages and provides the encoded traffic or message to the TDD transmission/reception separator 615, under the control of the controller 611. A TDD decoder 614 included in the coding processor 610 decodes a signal received from the TDD transmission/reception separator 615 under the control of the controller 611.

The FDD transmitter 616a of the modem and radio processor 616 up-converts coded symbols received from the FDD encoder 612 at a transmission frequency band and then provides the up-converted symbols to the diplexer 601, under the control of the controller 611. A TDD transmitter 616b of the modem and radio processor 616 up-converts symbols received from the TDD transmission/reception separator 615 at a transmission band frequency and then provides the up-converted symbols to the switch 602, under the control of the controller 611. Finally, a TDD receiver 616c of the modem and radio processor 616 down-converts a radio frequency (RF) signal received from the switch 602 and then provides the down-converted signal to the TDD transmission/reception separator 615, under the control of the controller 611.

The TDD transmission/reception separator 615, under the control of the controller 611, connects the TDD transmitter 616b to the TDD encoder 613, or connects the TDD receiver 616c to the TDD decoder 614. In addition, the TDD transmission/reception separator 615 provides a switch control signal output from the controller 611 to the switch 602 for switching control.

The controller 611 of the mobile station sets the switch 602 according to a reverse transmission mode, i.e., TDD mode or FDD mode, determined depending on a position of the mobile station within the cell. In addition, the controller 611 controls the encoders and the decoder according to a mode received from the base station, and performs path control for transmission/reception separation by the TDD transmission/reception separator 615. Further, the controller 611, though not illustrated in FIG. 6, controls communication devices provided to detect geographical position information of the mobile station. The controller 611 stores the position information therein or in a separate memory (not shown in FIG. 6). The controller 611 reports measured transmission power of a pilot signal received from the base station, and controls undepicted devices for measuring power of a pilot signal. Further, the controller 611 acquires diverse information according to a broadcast signal received from the base station, and achieves synchronization with the base station.

Figure 7:
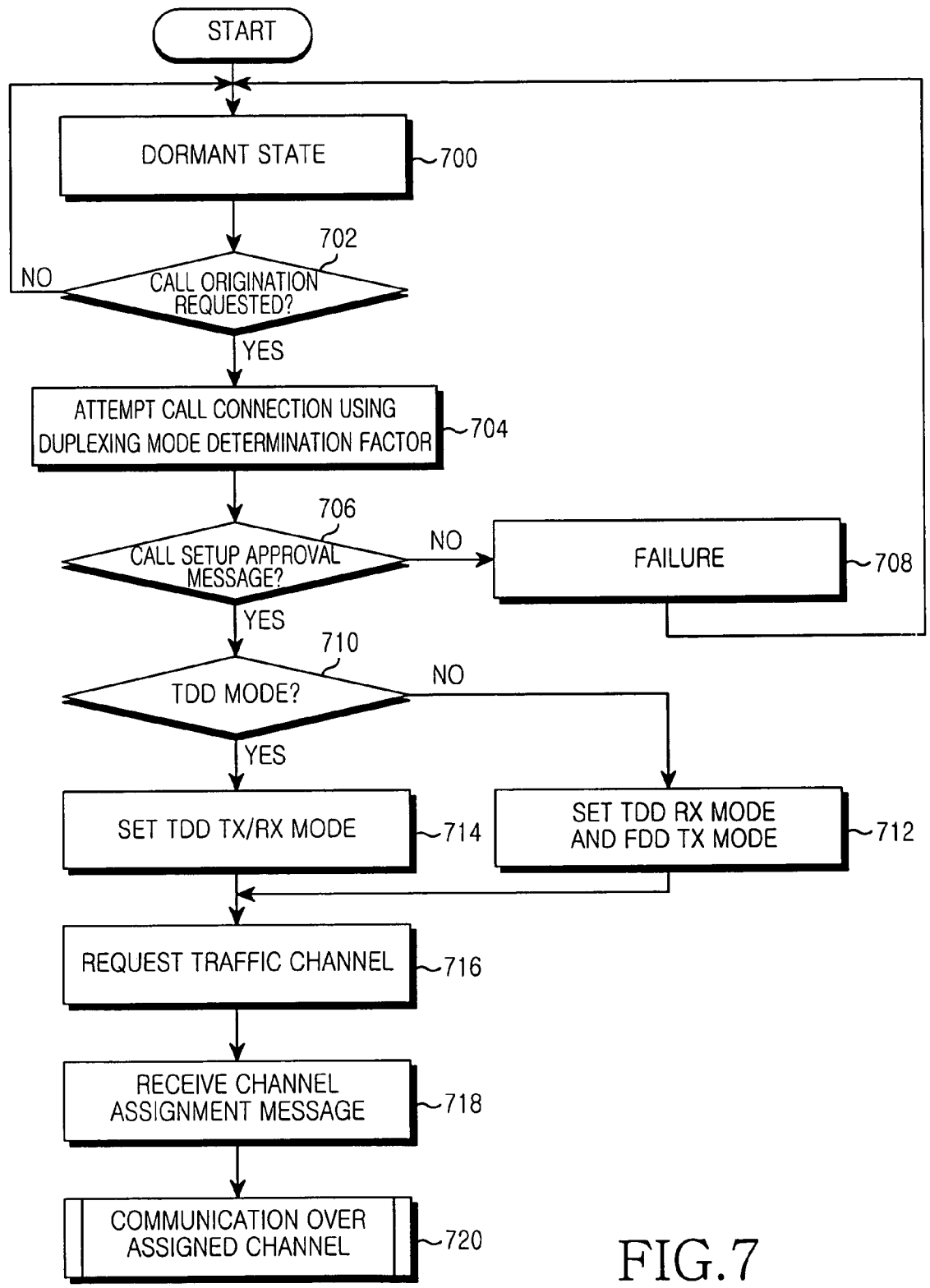
FIG. 7 is a flowchart illustrating an operation performed during call origination by a mobile station in a wireless communication system employing TDD and FDD according to the present invention.

FIG. 7 is a flowchart illustrating an operation performed during call origination by a mobile station in a wireless communication system employing TDD and FDD according to the present invention. With reference to FIGS. 6 and 7, a detailed description will now be made of a procedure for setting a mode by selecting TDD or FDD during call origination and then performing communication.

In step 700, the controller 611 of the mobile station holds a dormant state. Here, the "dormant state" means a call waiting state in which the mobile station performs only an operation of receiving a broadcast signal from a base station, measuring and storing pilot power, and acquiring position information of the mobile station, but no call origination and call termination occurs. Holding the dormant state, the controller 611 determines in step 702 whether call origination is requested by a user. When call origination is requested through a key input device, the controller 611 proceeds to step 704, and otherwise, returns to step 700 to hold the dormant state. It should be noted that FIG. 7 shows only a call setup procedure and does not consider other situations.

In step 704, the controller 611 generates a connection attempt message for requesting call connection, including the information measured in step 700, i.e., duplexing mode determination factors such as power of a pilot signal measured by the mobile station and geographical position information of the mobile station. The controller 611 transmits the message generated in step 704 over a particular access channel. When the message is transmitted by the mobile station, the base station performs the process of the steps 400 to 412 of FIG. 4.

Thereafter, the controller 611 waits for a message to be received from the base station. If a message is received from the base station, the controller 611 determines in step 706 whether the message received from the base station is a call setup approval message. If it is determined in step 706 that the message received from the base station is a call setup approval message, the controller 611 proceeds to step 710. Otherwise, if it is determined in step 706 that the message received from the base station is not a call setup approval message, it means that the received message is the channel assignment failure message transmitted in step 406 of FIG. 4, so the controller 611 performs a failure process in step 708 and then returns to step 700 to hold the dormant state.

In step 710, the controller 611 determines whether a TDD mode is set by the base station. If it is determined in step 710 that the TDD mode is set, the controller 611 proceeds to step 714 where it sets the TDD mode by controlling the switch 602 and the TDD transmission/reception separator 615. Otherwise, if it is determined in step 710 that an FDD mode is set, the controller 611 proceeds to step 712. In step 712, the controller 611 sets a TDD mode for a reception mode. This is because for a forward link, the invention sets a TDD mode for all mobile stations. Further, the controller 611 sets an FDD mode as a transmission mode. In this case, the mobile station is located in a remote area of the base station.

Following steps 712 or 714, the controller 611 requests a traffic channel in step 716. At this point, if a TDD mode is set for reverse transmission, the controller 611 requests assignment of a time slot, and if an FDD mode is set for reverse transmission, the controller 611 requests assignment of frequency resource for reverse transmission. After requesting assignment of a traffic channel in step 716, the controller 611 receives a channel assignment signal from the base station in step 718. In this case, a channel is assigned in step 414 of FIG. 4 and then transmitted to the mobile station. When channel assignment is performed in this way, the controller 611 proceeds to step 720 where it performs reverse communication through a channel assigned with a frequency resource or a channel assigned with a frequency resource and a time slot. In addition, for reception over a forward link, traffic is received over a corresponding channel of a TDD frequency resource.

Figure 8:
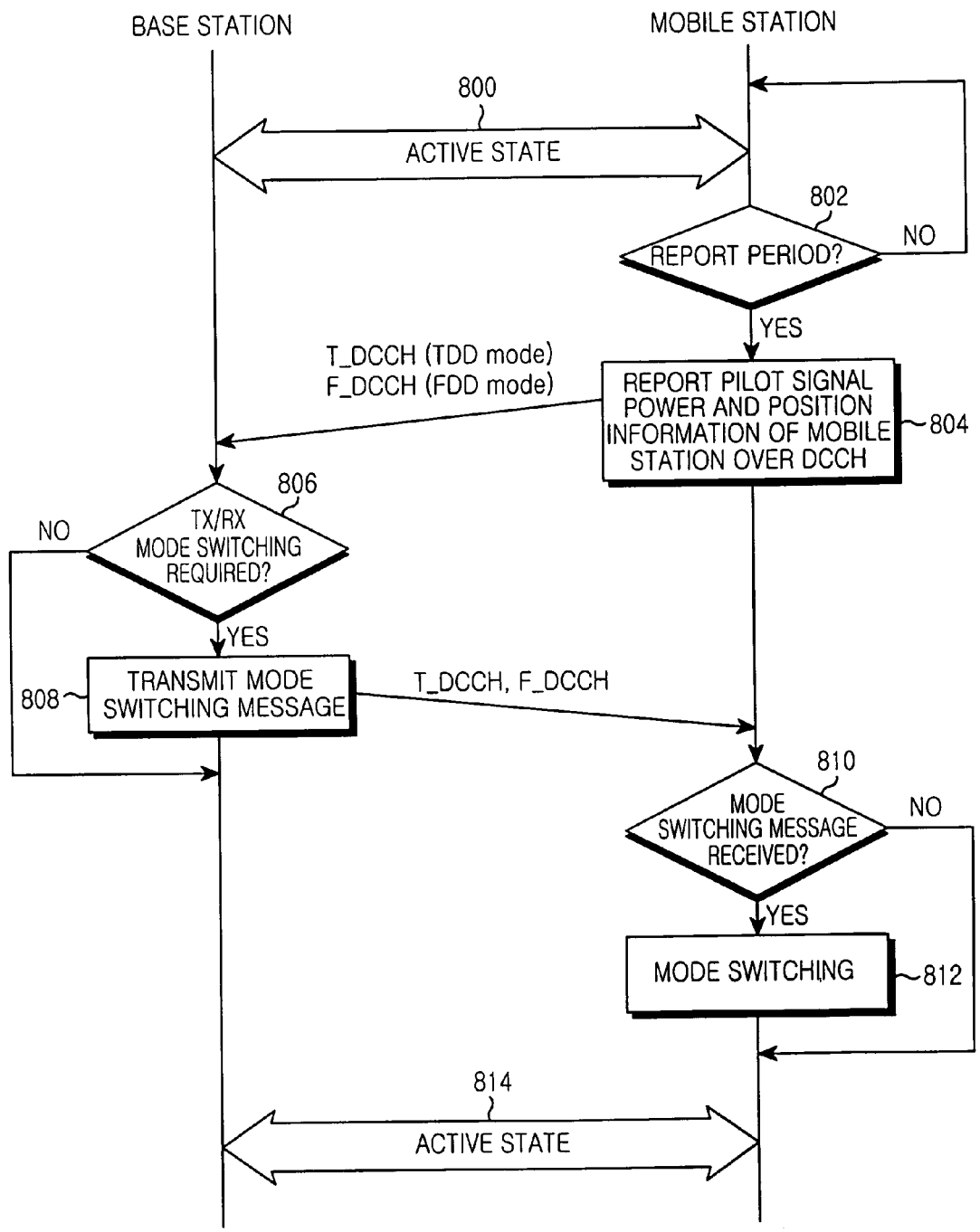
FIG. 8 is a flowchart illustrating an inter-mode handover operation in a wireless communication system employing TDD and FDD according to the present invention.

FIG. 8 is a flowchart illustrating an inter-mode handover operation in a wireless communication system employing TDD and FDD according to the present invention. A signaling flow during handover between a TDD mode and a FDD mode according to the present invention will be described in detail herein below with reference to FIGS. 3, 6 and 8.

The control procedure of FIG. 8 shows a handover procedure in a state where a communication channel between a mobile station and a base station is opened. Therefore, the mobile station is communicating with the base station in a TDD mode or a FDD mode according to the present invention. Step 800 of FIG. 8 shows a process in which a TDD mode is set for forward communication between the base station and the mobile station, and the TDD mode or an FDD mode is set for reverse communication.

The controller 611 periodically reports to the base station the information capable of detecting a position of the mobile station in addition to either or both of geographical position information of the mobile station and power of a pilot signal. Therefore, while performing communication in step 800, the controller 611 determines in step 802 whether a predetermined report period to the base station has arrived. If it is determined in step 802 that the predetermined report period to the base station has arrived, the controller 611 proceeds to step 804, and otherwise, returns to step 800 to hold an active state (or communication state).

In step 804, the controller 611 generates a report message using power of a pilot signal and geographical position information of the mobile station and transmits the report message to the base station over a dedicated control channel (DCCH). At this point, if a reverse channel set up between the base station and the mobile station is for a TDD mode, a reverse report is made over a TDD dedicated control channel (T_DCCH). However, if a reverse channel set up between the base station and the mobile station is for an FDD mode, a reverse report is made over an FDD dedicated control channel (F_DCCH). When position information of a mobile station is detected using another method other than the above method, a message corresponding thereto is generated and then transmitted to the base station. That is, step 804 shows a process of the reporting duplexing mode determination factors to the base station.

If the controller 611 of the mobile station makes a position report in step 804, the controller 311 of the base station determines in step 806 whether transmission/reception mode switching is required due to a change in position of the mobile station. That is, the controller 311 determines whether it is necessary to change a mode of a traffic channel set up between the base station and the mobile station. Such determination is made in the same method as done when a mode is initially set between the mobile station and the base station. For example, if a mobile station was previously located in a remote area, reverse transmission was being performed in an FDD mode. If a position of the mobile station changes due to movement of the mobile station's user from a remote area to a close area, the mobile station will perceive that power of a pilot signal detected from the base station has increased. Therefore, the mobile station reports a pilot power value higher than before to the base station. At this point, if the mobile station moves to a close area, the reported pilot power has a value higher than a threshold set to distinguish between the close area and the remote area. The base station determines that mode switching from the remote area to the close area is required, if pilot signal power having a value higher than a predetermined threshold is received, or geographical position information received from the mobile station is detected as a close area, or both of the two methods are satisfied. In contrast, when the mobile station moves from a close area to a remote area, the mode switching operation is performed in the opposite way.

If it is determined that transmission/reception mode switching is required, the base station proceeds to step 808, and otherwise, proceeds to step 814. In step 808, the controller 311 of the base station generates a mode switching message, assigns a new channel, and transmits the new channel to the mobile station along with the mode switching message. Alternatively, the base station may assign a new channel through negotiation with the mobile station after transmitting the mode switching message. Such a mode switching message is transmitted over a TDD dedicated control channel T_DCCH when communication is performed in a TDD mode, and is transmitted over an FDD dedicated control channel F_DCCH when communication is performed in an FDD mode.

A description will now be made of an operation performed when a mode switching message is received. When a control message is received from the base station over an FDD dedicated control channel F_DCCH or a TDD dedicated control channel T_DCCH, the controller 611 of the mobile station determines in step 810 whether the received message is a mode switching message. If it is determined in step 810 that the message received over the dedicated control channel is a mode switching message, the controller 611 proceeds to step 812 where it performs mode switching. That is, if a mode currently set for a reverse link is an FDD mode, the current mode is switched to a TDD mode. Likewise, if a mode currently set for a reverse link is a TDD mode, the current mode is switched to an FDD mode.

However, if it is determined in step 810 that a mode switching message is not received, the controller 611 proceeds to step 814. In FIG. 8, the active states of steps 800 and 814 are separately illustrated. It is noted that the active state of step 800 is identical to the active state of step 814 unless the current mode is switched. Even while such control messages are exchanged, a state in which the channel is set up is held. In addition, when the current mode is switched, the active state of step 800 is held until before step 812, and if mode switching is performed in step 812, the current mode is switched to a new mode in step 812 and communication is performed over a new channel in step 814.

When one base station supports different modes in this way, it is necessary to provide handover for mode switching due to a change in position of the mobile station, in order to perform smooth communication.

As described above, the wireless communication system can provide a TDD mode suitable to a high asymmetry rate, a high traffic rate and a microcell and also provide FDD technology suitable to a mobile station with high mobility and a macrocell, by providing hybrid duplexing technology. A mobile station in a close area performs communication in a TDD mode, while a mobile station in a remote area performs communication in an FDD mode. The present invention can provide a variable asymmetric service and transmit traffic more efficiently. When hybrid communication technologies are used, the present invention can reduce interference by setting positions of time slots in the proposed method. In addition, both of two different modes can be supported without providing a transmission/reception part for both transmission and reception in a system and a mobile station, also without providing an encoder and a decoder to a modem, thereby contributing to a reduction in the cost. The present invention provides a TDD mode, which is unsuitable to interference and a macrocell but effective for an asymmetric service, and simultaneously provides an FDD mode, which is relatively ineffective for an asymmetric service but useful to provide a service in a mobile station with high mobility and a macrocell.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless communication system for providing a service in a time division duplexing (TDD) mode and a frequency division duplexing (FDD) mode, the system comprising:

a mobile station for, during call setup, transmitting a duplexing mode determination factor to a base station, setting a TDD mode or an FDD mode as a reverse mode set by the base station, and setting up a channel for the set reverse mode and a forward channel to perform communication; and a base station for, during call setup, receiving the duplexing mode determination factor from the mobile station, setting a reverse mode to the TDD mode or the FDD mode using the received duplexing mode determination factor, and setting up a reverse channel for the set mode and a TDD mode for forward transmission to communicate with the mobile station;

wherein the base station assigns to the mobile station a channel of a forward link and a reverse link in the TDD mode if the mobile station is located in a close area, and a channel of the forward link in the TDD mode and a channel of the reverse link in the TDD mode if the mobile station is located in a remote area;

wherein the base station assigns a frequency resource in a predetermined area among frequency resources available in the base station as reverse link resource in the FDD mode for reverse transmission, and assigns the remaining available frequency resources to the forward link and the reverse link in the TDD mode; and wherein the base station sets up a guard time of a predetermined time between switching times of the forward link and the reverse link in the TDD mode, and assigns time slots beginning at a time slot in an area close to the guard time in order of each mobile station nearest to the base station.

2. The wireless communication system of claim 1, wherein the mobile station generates the duplexing mode determination factor and reports the generated duplexing mode determination factor to the base station during predetermined periods in an active state.

3. The wireless communication system of claim 2, wherein the base station determines whether switching of a reverse mode of the mobile station is required each time a duplexing mode determination factor is received from the mobile station in the active state, and controls switching of the set mode and assigns a new channel to the mobile station to perform communication when mode switching is required.

4. The wireless communication system of claim 1, wherein the duplexing mode determination factor includes at least one of power of a pilot signal received from the base station and geographical position information of the mobile station.

5. The wireless communication system of claim 4, wherein the duplexing mode determination factor is transmitted over a dedicated control channel for the set mode.

6. The wireless communication system of claim 1, wherein the duplexing mode determination factor is transmitted over a dedicated control channel for the set mode.

7. The wireless communication system of claim 1, wherein channels for the forward link are assigned the time slots according to a position of the mobile station, detected from the duplexing mode determination factor.

8. The wireless communication system of claim 1, wherein channels for the reverse link for the TDD mode are assigned the time slots according to a position of the mobile station, detected from the duplexing mode determination factor.

9. A call control method in a base station for a wireless communication system, the base station being capable of communicating with a mobile station in a time division duplexing (TDD) mode and a frequency division duplexing (FDD) mode, the method comprising the steps of:

during call assignment to the mobile station, analyzing a duplexing mode determination factor received from the mobile station to determine whether the mobile station is located in a close area with respect to the base station; and assigning to the mobile station a channel of a forward link and a reverse link in the TDD mode if the mobile station is located in the close area, and a channel of the forward link in the TDD mode and a channel of the reverse link in the FDD mode if the mobile station is located in a remote area;

wherein a frequency resource in a predetermined area among frequency resources available in the base station is assigned as a resource for the reverse link in the FDD mode for reverse transmission, and the remaining available frequency resources are assigned to the forward link and the reverse link in the TDD mode; and wherein the base station sets up a guard time of a predetermined time between switching times of the forward link and the reverse link in the TDD mode, and assigns time slots beginning at a time slot in an area close to the guard time in order of each mobile station nearest to the base station.

10. The call control method of claim 9, wherein channels for a forward link are assigned the time slots according to a position of the mobile station, detected from the duplexing mode determination factor.

11. The call control method of claim 9, further comprising:

checking again a position of the mobile station to determine whether the mobile station is located in the close area or the remote area upon receiving a duplexing mode determination factor from the mobile station during communication with the mobile station; and determining whether mode switching is required according to the checked position of the mobile station, and assigning a mode switching message and a new channel to perform communication if mode switching is necessary.

12. A call control method in a mobile station for a mobile communication system providing a time division duplexing (TDD) mode and a frequency division duplexing (FDD) mode, the method comprising the steps of:

generating a duplexing mode determination factor and reporting the generated duplexing mode determination factor to a base station when assignment of a call is necessary;

setting transmission and reception modes based on the received mode upon receiving a mode for a reverse link from the base station; and sending a channel assignment request to the base station to perform communication with a channel assigned during channel assignment;

wherein the base station assigns to the mobile station a channel of a forward link and the reverse link in the TDD mode if the mobile station is located in a close area, and a channel of the forward link in the TDD mode and a channel of the reverse link in the FDD mode if the mobile station is located in a remote area;

wherein a frequency resource in a predetermined area among frequency resources available in the base station is assigned as a resource for the reverse link in the FDD mode for reverse transmission, and the remaining available frequency resources are assigned to a the forward link and the reverse link in the TDD mode; and wherein the base station sets up a guard time of a predetermined time between switching times of the forward link and the reverse link in the TDD mode, and assigns time slots beginning at a time slot in an area close to the guard time in order of each mobile station nearest to the base station.

13. The call control method of claim 12, further comprising the steps of:

generating information obtained using the duplexing mode determination factor and reporting the generated information to the base station during predetermined periods during communication; and performing mode switching and performing communication with the new channel if a reverse mode switching request is received from the base station and a new channel is assigned by the base station.

14. The call control method of claim 13, wherein the information obtained using the duplexing mode determination factor, transmitted to the base station during the predetermined periods, is transmitted over a dedicated control channel for the reverse mode.

15. The call control method of claim 12, wherein the information obtained using the duplexing mode determination factor comprises at least one of power of a pilot signal received from the base station and geographical position information of the mobile station.

16. The call control method of claim 13, wherein the information obtained using the duplexing mode determination factor comprises power of a pilot signal received from the base station and geographical position information of the mobile station.

17. A base station apparatus for separately providing a service in a time division duplexing (TDD) mode and a frequency division duplexing (FDD) mode according to a distance between the base station and a mobile station, comprising:

a coding processor for performing TDD encoding and TDD decoding, and performing FDD decoding;

a diplexer for separating a reception signal at a frequency band assigned to the FDD mode from a signal at a frequency band assigned to the TDD mode;

a radio processor for down-converting a signal at a frequency band assigned to the FDD mode, and up- or down-converting a signal at a frequency band assigned to the TDD mode;

a TDD transmission/reception separator for separating transmission and reception of a TDD duplexing signal between the coding processor and the radio processor; and a controller for controlling the TDD transmission/reception separator, the coding processor and the radio processor, and during call assignment to the mobile station, determining a reverse transmission mode according to a duplexing mode determination factor received from the mobile station and setting up a channel for the determined reverse mode and a forward channel;

wherein the base station assigns to the mobile station a channel of a forward link and reverse link in the TDD mode if the mobile station is located in a close area and a channel of the forward link in the TDD mode and a channel of the reverse link in the FDD mode if the mobile station is located in a remote area;

wherein the controller assigns a frequency resource in a predetermined area among frequency resources available in the base station as reverse link resource in the FDD mode for reverse transmission, and assigns the remaining available frequency resources to the forward link and the reverse link in the TDD mode wherein the controller sets up a guard time of a predetermined time between switching times of the forward link and the reverse link in the TDD mode, and assigns time slots beginning at a time slot in an area close to the guard time in order of each mobile station nearest to the base station.

18. A mobile station apparatus for a mobile communication system separately providing a service in a time division duplexing (TDD) mode and a frequency division duplexing (FDD) mode according to a distance between a base station and the mobile station, comprising:

a coding processor for performing TDD encoding and TDD decoding, and performing FDD encoding;

a diplexer for separating a reception signal at a frequency band assigned to the FDD mode from a signal at a frequency band assigned to the TDD mode;

a radio processor for up-converting a signal at a frequency band assigned to the FDD mode, and up- or down-converting a signal at a frequency band assigned to the TDD mode;

a TDD transmission/reception separator for separating transmission and reception of a TDD signal between the coding processor and the radio processor; and a controller for controlling the TDD transmission/reception separator, the coding processor and the radio processor, and during call assignment, generating information obtained using a duplexing mode determination factor, delivering the generated information to the base station, and controlling communication using a channel assigned for a mode set by the base station;

wherein the base station assigns to the mobile station a channel of a forward link and a reverse link in the TDD mode if the mobile station is located in a close area, and a channel of the forward link in the TDD mode and a channel of the reverse link in the FDD mode if the mobile station is located in a remote area;

wherein a frequency resource in a predetermined area among frequency resources available in the base station is assigned as a resource for the reverse link in the FDD mode for reverse transmission, and the remaining available frequency resources are assigned to the forward link and the reverse link in the TDD mode; and wherein the base station sets up a guard time of a predetermined time between switching times of the forward link and the reverse link in the TDD mode, and assigns time slots beginning at a time slot in an area close to the guard time in order of each mobile station nearest to the base station.

19. A method for allocating resources in a wireless communication system, the wireless communication system including a plurality of mobile stations, and a base station for allocating and communicating with the mobile stations, the method comprising the steps of:

dividing, by the base station, a system bandwidth into a different time division duplexing (TDD) bandwidth and a different frequency division duplexing (FDD) bandwidth;

receiving a mode determination factor from the mobile station; and allocating at least one of TDD bandwidth and FDD bandwidth according to the mode determination factor;

wherein the base station assigns to the mobile station a channel of a forward link and a reverse link in the TDD mode if the mobile station is located in a close area, and a channel of the forward link in the TDD mode and a channel of the reverse link in the FDD mode if the mobile station is located in a remote area;

wherein the base station assigns a frequency resource in a predetermined area among frequency resources available in the base station as reverse link resource in the FDD mode for reverse transmission, and assigns the remaining available frequency resources to the forward link and the reverse link in a TDD mode; and wherein the base station sets up a guard time of a predetermined time between switching times of the forward link and the reverse link in the TDD mode, and assigns TDD bandwidth resource beginning at a time slot in an area close to the guard time in order of each mobile station nearest to the base station.

20. The method of claim 19, wherein the TDD bandwidth is greater than the FDD bandwidth.

21. The method of claim 19, wherein the TDD bandwidth includes at least one of downlink resources and uplink resources.

22. The method of claim 21, wherein the FDD bandwidth includes uplink resources.

23. The method of claim 22, wherein the allocating step comprises:

comparing the mode determination factor with a predetermined threshold;

allocating uplink and downlink resources of the TDD bandwidth if the mode determination factor is less than the predetermined threshold; and allocating uplink resources of FDD bandwidth if the mode determination factor is greater than or equal to the predetermined threshold.

24. The method of claim 23, wherein the mode determination factor is a pilot signal strength, which at least one mobile station (MS) receives from the base station.

25. The method of claim 23, wherein the mode determination factor is geographical position information of the mobile station.

26. The method of claim 23, wherein the mode determination factor is a moving velocity of a mobile station.

27. The method of claim 23, wherein the mode determination factor is determined at least to be one of a pilot signal strength, which at least one MS receives from the base station, and the moving velocity of the mobile station.

28. A transmitting and receiving apparatus in a wireless communication system, the wireless communication system including a plurality of mobile stations, and a base station for allocating and communicating with the mobile stations, the apparatus comprising:

an encoding processor for processing a signal of a TDD bandwidth and a signal of a FDD bandwidth and operating in a TDD and/or an FDD mode;

a diplexer for dividing the TDD bandwidth signal and the FDD signal;

a transmission/reception separator for dividing, transmitting and receiving the signal, sending the transmitting signal to the diplexer, and sending the receiving signal to the encoding processor; and a controller for controlling the encoding processor, the transmission/reception separator and diplexer, and allocating TDD and FDD bandwidth resources using a mode determination factor of the mobile station;

wherein the base station assigns to the mobile station a channel of a forward link and a reverse link in the TDD mode if the mobile station is located in a close area, and a channel of the forward link in the TDD mode and a channel of the reverse link in the FDD mode if the mobile station is located in a remote area;

wherein the controller assigns a frequency resource in a predetermined area among frequency resources available in the base station as the reverse link in the FDD mode resource for reverse transmission, and assigns the remaining available frequency resources to the forward link and the reverse link in the TDD mode; and wherein the controller sets up a guard time of a predetermined time between switching times of the forward link and the reverse link in the TDD mode, and assigns the TDD bandwidth resource beginning at a time slot in an area close to the guard time in order of each mobile station nearest to the base station.

29. The apparatus of claim 28, wherein the encoding processor comprises:

an FDD decoder for processing the received FDD signal and sending the processed FDD signal to the transmission/reception separator;

a TDD decoder for processing the received TDD signal and sending the processed TDD signal to the transmission/reception separator; and a TDD encoder for processing the TDD bandwidth signal, and transmitting the processed signal to the transmitting and received separator.

30. A method for allocating resource in a base station of wireless communication system for providing a service in both time division duplexing (TDD) mode and frequency division duplexing (FDD) mode using first and second frequency bands, the method comprising:

allocating forward and reverse channels using the first frequency band in a pair in the TDD mode; and allocating the forward channel using the first frequency band and the reverse channel using the second frequency band in a pair in the FDD mode, wherein the station assigns to a mobile station a channel of a forward link and a reverse link in the TDD mode it the mobile station is located in a close area, and a channel of the forward link in the TDD mode and a channel of the reverse link in the FDD mode if the mobile station is located a remote area;

wherein the first frequency band is used for transmission and reception of both the forward and reverse channels in the TDD mode, and the second frequency band is dedicated to the reverse channel in the FDD mode; and wherein the base station sets up a guard time of a predetermined time between switching times of the forward link and the reverse link in the TDD mode, and assigns time slots beginning at a time slot in an area close to the guard time in order of each mobile station nearest to the base station.

* * * * *